Oct. 8, 1940.    J. W. STEVENS    2,217,261
METHOD OF CONSERVING FRUIT JUICES
Filed Aug. 5, 1939
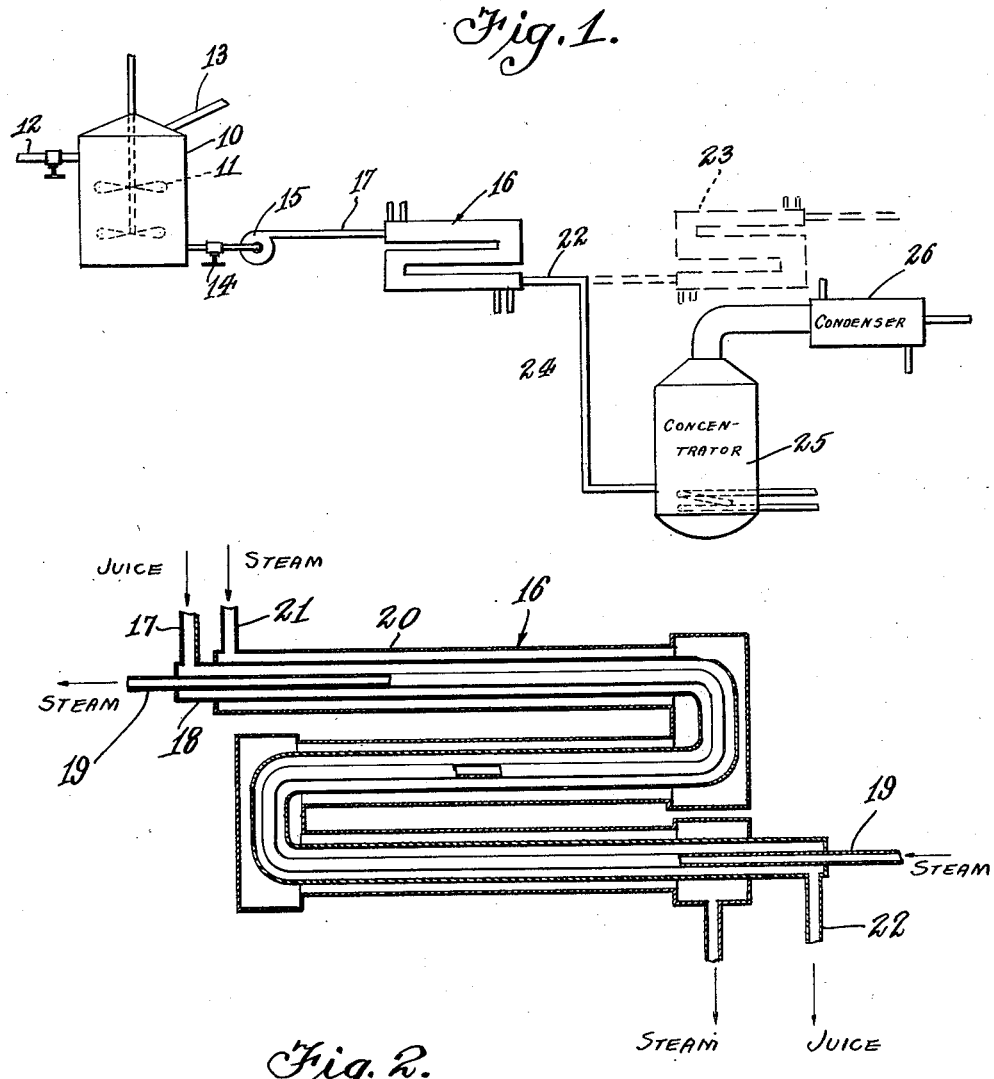
Inventor
Jesse W. Stevens
By Lyon & Lyon
Attorney Patented Oct. 8, 1940

2,217,261

UNITED STATES PATENT OFFICE 2,217,261

METHOD OF CONSERVING FRUIT JUICES

Jesse W. Stevens, Ontario, California

Application August 5, 1939, Serial No. 288,687

14 Claims. (Cl. 99—155)

This invention relates to the treatment of fruit juices and to the production of certain new, useful and improved fruit juices and products containing fruit juices and fruit juice preparations. The invention has for its object the provision of a method of treating fruit juices in such manner as to impart new and desirable characteristics to fruit juices and fruit juice products.

This application is in substitution for and a continuation-in-part of co-pending application Serial No. 90,745, filed July 15, 1936, which was in substitution for and a continuation-in-part of co-pending application Serial No. 580,643, filed December 12, 1931.

It is well known that fruit juices, and particularly citrus juices, are unstable in that undesirable changes in appearance and flavor occur when such juices are permitted to stand for even short periods of time, say a day or two.

Among the changes which fruit juices generally and citrus juices in particular are liable to undergo are the development of "off" flavors, changes in color, and changes in the nature and/or conditions of soluble and insoluble matter present with, or contained in, the fruit juices or preparations containing the same. A "cooked" flavor may develop in citrus juices, as, for example, when they are concentrated, even at temperatures as low as 33° to 35° C., under high vacuum.

Fruit juices are subject to pronounced darkening in color, which greatly decreases their attractiveness for beverage and other purposes. Products containing fruit juices are also subject to color changes.

Likewise, changes occur in the condition and nature of dissolved and undissolved solids in fruit juices and preparations containing fruit juices. The suspended matter present in fresh citrus juices, for example, precipitates or coagulates completely and settles out on standing for a few days, leaving a nearly clear supernatant liquid, thus giving a very unattractive material whose salability is greatly impaired.

Burred juices and other juices containing large amounts of suspended matter may exhibit a visible jellying phenomenon together with flocculation. The jellying may cause the juice to become slightly mushy in nature, or a relatively continuous, weak jelly mass may result. These or similar phenomena are apparent in varying degrees, particularly in concentrated juices. Concentration of ordinary pure orange juice hastens the flocculation mentioned hereinabove.

Jellying is also increased by concentration and if the concentration is carried far enough, a solid jelly may result. Jellying results in an unnatural appearance and may make handling difficult or well-night impossible in such containers as are usually used for citrus juices. The concentration of lemon juice, grapefruit juice or acidified orange juice, if sufficient to increase the active acidity to a point represented by a pH value below about pH 3, appears to retard flocculation.

In order to produce salable, satisfactory juices, it is necessary that such fruit juices have a desired natural color which will not rapidly darken or brown upon standing. Secondly, the taste of the fruit juice should approximate a natural taste and the cooked or bitter tastes and other "off" tastes often imparted to or developed in treated juices reduced to a minimum.

A third necessary characteristic is that the juice contain naturally present, very finely divided and colloidal material termed "cloud." The characteristic color of many citrus juices is due to extremely fine and/or colloidal particles. Clarification renders the juice very unattractive. Fourth, the juice should contain those coarser solids which are normally present in freshly extracted juices. Such coarser insoluble solids comprise portions of the pulp, juice sacs, and the like. These coarser solids are characteristic of burred juices but may not be present to any material extent in pressed or rolled juices. These solids ordinarily settle out in time but their presence is highly desirable since they assist in attaining a more natural appearance and enhance the flavor. Moreover, these solids should be present in free form and not coagulated.

Fifth, the treatment of the juice should permit its utilization either in unconcentrated or concentrated form, and concentration should be possible without deleterious effects upon color, taste, solids, or the like. Sixth, the juice should not jellify. In many prior methods the treatments have caused or permitted jellification of the juice, bringing about coagulation or flocculation of the insoluble solids. Such jellification impairs the appearance and flavor of the juice and may progress to such an extent that the juice can not be dispensed from usual containers and dispensing devices.

It is to be understood that the jellification hereinabove referred to is not the formation of a pectin-sugar-acid gel of the usual type. It may be that by concentrating to a particular stage, some citrus juices which happen to have a suitable pectin and acid content may achieve a true gel. These are not, however, ordinarily met with in the concentration of citrus juices and the present invention is not directed thereto.

The present invention relates to a process of stabilization whereby the desirable properties of citrus juices and citrus juice products are retained for long periods of time and undesirable changes inhibited or retarded. Since the properties which need to be developed in the juice are numerous, the process of stabilization takes into consideration a number of factors heretofore not recognized by the workers in the art. Admittedly, attempts have been made to prevent deterioration of citrus juices by sujecting them to a heat treatment but heat treatment alone is not effective. The extent and duration of the heat treatment must be carefully controlled and also correlated with the characteristics of the juice being treated. Such correlation forms one phase of the present invention.

The most important result which it is desired to attain by stabilization is the maintenance of the finely divided and/or colloidal particles, which form the cloud, in suspension in the citrus juice, the juice being either in undiluted, diluted, unconcentrated, concentrated, or rediluted form. It has been discovered that enzyme-like substances are present in citrus juices and that they exert a decided effect upon the cloud and other characteristics of the juice. These substances are apparently enzymic in character and it has been discovered that their activity is materially altered by heat. For this reason these substances will be referred to hereinafter as thermolabile substances. It is necessary to render these cloud-coagulating enzymic substances innocuous without bringing about those highly undesirable changes in the juice which are normally developed when a citrus juice is heated.

It has also been discovered that these thermolabile substances are more readily inactivated in juices of high acidity than in juices of relatively low acidity. For this reason, the stabilization process of this invention correlates the heat treatment to which the juice is subjected in the process with the acidity of the fruit juice.

It has also been discovered that even though the temperature and time of treatment is correlated with the acidity of the juice, a still further factor must be taken into consideration, namely, the quantity of and size of solids present in the juice. Citrus juices, for example, may be extracted in different manners. One of the usual ways of extracting juice comprises cutting the fruit in half and then pressing the halves against rotating arbors or burrs. Juice so produced contains a relatively high percentage of coarse solids.

Another method often used for the preparation of citrus juice products results in the so-called "pulp juice." In this substantially the whole fruit may be employed. The stem portion and the navel portion of navel oranges and any scarred or otherwise unsuitable parts may be cut off since these may cause dark or black specks in the finished product. The fruit is passed through a comminuting device which reduces the fleshy interior and a considerable amount of the peel to a pulpy condition. This juice may then be passed through a suitable screen to remove the desired amount of the coarser pulp and peel particles. This product is often prepared so as to contain about the same proportion of coarse solids as the juice prepared by burring as described above. This factor will, of course, be governed by the extent to which the juice is screened. The product may have a pH slightly higher than that of juice prepared from similar fruit by the burring process, presumably due to the more intimate contact of the juice with the albedo. It will also contain a relatively high proportion of the essential oils from the peel of the fruit.

In another method, the fruit is passed through rolls which express the juice. Rolled juice has practically no coarse solids because it is generally screened and centrifuged, whereas burred juices are not screened to the same extent.

It has been discovered that the temperature and time of treatment should be correlated with the character of the insoluble solids present and in general juices containing higher percentages of coarser solids need to be treated at a slightly higher temperature or for a longer time than juices containing smaller percentages of coarser solids. As the size and quantity of the solids increases, the combined temperature-time relationship should also increase. Preferably, however, the time and temperature of treatment should not ordinarily exceed certain subsequently defined limitations. Moreover, the times and temperatures of treatment should not be less than certain predetermined and hereinafter defined minima.

It is desirable that all citrus juices contain some pectin, at least that quantity of soluble pectin which is normally present in extracted fresh juice, since the presence of pectin facilitates the suspension of the cloud. In untreated juices, however, the pectin facilitates or promotes flocculation of the suspended insoluble solids, this coagulation or flocculation of the cloud being apparently due to the action of the enzymes which convert the soluble pectin into some insoluble form (probably pectate), this insoluble form then carrying down the finely divided suspended particles. When juices are treated in accordance with this invention, however, the enzymes or thermolabile substances are rendered inactive and as a result, pectin (and its desirable characteristics and effects) can be retained in the juice. In addition, by the treatment the amount of pectin present in the juice as soluble pectin will be increased by the action of the heat and the acid juice upon pectin-containing pulp, etc., present in the juice.

Although reference has been made hereinabove to the presence of enzymic bodies, it may be further stated that two cloud-coagulating enzymes appear to be present in citrus juices. One is apparently more active than the other at relatively low pH conditions and at low temperatures, for example, at a pH of 3.3 or therebelow and at temperatures of 10° C. It is not intended to indicate by this statement, however, that the optimum for the first one lies at this low temperature and low pH. This enzyme appears to be destroyed by subjecting it to a temperature of from about 65° C. to 70° C.

The second form of enzyme appears to have its maximum flocculating effect on the juice at pH values about 3.0 to 3.3 and at more elevated temperatures, say at a temperature of around 35° C., or perhaps even higher. This second enzyme appears to be destroyed by subjecting it to temperatures of the order of 88° C., when at a pH of the order of 3.6.

The present invention correlates the various discoveries made and discloses and teaches the preparation and handling of various citrus juices in such manner as to stabilize the juice, i. e., retard changes in flavor and color and retard or prevent flocculation of the cloud and jellification, these desirable ends being produced for the commercial life of the product.

An object of the present invention, therefore, is to disclose and provide a method of treating citrus juices whereby the juices may be stabilized for remarkably long periods of time.

Another object is to disclose and provide a method of treating citrus juices whereby enzymic substances present in such juices are rendered innocuous without the development of the "off" flavors and without producing the darkening which are the result of previously known heat treatments of citrus juices.

A further object of the invention is to disclose and provide citrus juice products either in undiluted form, that is, having a substantially normal soluble and insoluble solids content, in diluted, unconcentrated, or concentrated form or in rediluted form, which products are all characterized by stability of finely divided suspended insoluble solids or cloud.

These and other objects, uses and advantages of the invention will be more clearly understood from the following detailed description. For purposes of facilitating understanding, reference will be had to the appended drawing, in which:

Fig. 1 is a diagrammatic representation of means adapted for use in carrying out the process of this invention.

Fig. 2 is an enlarged diagrammatic representation of a preferred form of means in which the heating steps of the process may be carried out.

The method of operation embodying this invention includes rapidly heating and cooling the juice. The heat treatment of citrus and other fruit juices is not new, per se, as heretofore fruit juices, and especially citrus juices, have been pasteurized by placing a suitable quantity of the juice in a vessel and heating the juice to a temperature of from 140° to 160° F. during a period of from ¼ to 1½ hours. The juice is then maintained at this temperature for a period of time, usually about ½ hour, and then cooled. In some instances, it has been recommended that the juice be maintained at about 130° F. for about 2½ hours. In other instances, so-called continuous pasteurization with relatively low temperatures has been used.

These prior processes are usually quite effective in destroying bacteria, mold spores and yeasts, but they do not prevent the various deleterious changes outlined above. Juices so treated develop a decided cooked flavor and other stale or old juice flavors. The high temperatures employed can not be said to be the sole cause of the cooked flavors so developed. When fresh juice is concentrated under high vacuum at such low temperatures as 33° to 35° C. (about 90°–95° F.), the juice nevertheless develops these undesirable off flavors. Fruit juices pasteurized by the prior processes and concentrated but slightly, are much less likely to show changes in color, flavor and solids dispersion characteristics within a given time, than juices of higher concentration. Highly concentrated juices frequently exhibit jellying almost simultaneously with their removal from the concentrating pan, whereas with lower concentration the jellying may not occur for a week or two. Heat treatment other than that described herein has never, so far as I am aware, prevented flocculation and jellying.

By carrying out the heat treatment under the specific temperature and time conditions described hereinafter, it is possible to eliminate certain of the undesirable changes mentioned hereinabove by rendering the enzymes present in the juices inactive or innocuous. Mere destruction of the enzymes is not in itself sufficient. It is necessary to render the enzymes innocuous without bringing about highly undesirable changes in the juice. Ordinarily, it is quite possible to completely destroy the enzyme by a heating process but concurrently with such destruction highly undesirable changes in the juice being treated will be produced.

It has been found that the most critical variables influencing the process of stabilization to which this invention is directed are temperature, time, and acidity. The term "stabilization" as used herein refers to that condition of citrus juice products which insures the absence of flocculation of the cloud or jellification of the contents (i. e., the formation of a weak gel which may separate from the walls and tops of the containers) for the commercial life of the product. The commercial life may vary in length with the type of the product, being obviously at an end when the product for any other reason is no longer satisfactory as an article of commerce. And the desired commercial life may vary with the season, since the fruit used may be best available only for a short period, while the product is wanted throughout the year.

When operating in accordance with the preferred conditions herein defined, the citrus juice products can be stabilized for periods of ten to fourteen months or more, under conditions of storage favorable to keeping the juice. At high temperatures of storage, the time during which juice is maintained in stabilized form may be reduced while at low temperatures the time may be greatly extended. It is, of course, necessary to keep the juice free from organisms such as molds, which are capable of growing in the juice and which can cause flocculation of the juice, apparently by producing pectic enzymes during growth.

The use of the preferred heat treatment which I have discovered makes it possible to be certain that the cloud of the juice will not flocculate, even over very long periods of time. Likewise, particularly in unconcentrated orange juice products, the inception of darkening or browning will be very materially delayed.

The length of time during which a product will remain commercially satisfactory, as far as flocculation of cloud, flavor and color are concerned, will be influenced by the acidity of the product, the temperature of storage and the degree of stability imparted to the product by the treatment. Other factors may also have some influence, such as the type and character of the container and added ingredients.

Preferably, the stabilization treatment is effected before flocculation of the cloud takes place and for this reason the juices are subjected to the stabilization process as soon after extraction as is consistent with other desired operations. Preferably, the juices are subjected to a deaerating operation before stabilization treatment, although such deaeration is not essential. In general, when citrus juice products of different pH values and containing different amounts of coarse solids are being treated, the temperature and holding time (the time for which the juice is maintained at a given temperature) are governed in accordance with the pH and the amount of insoluble solids.

In order to facilitate understanding, it may be desirable to classify citrus juice capable of being treated according to this invention into (first) juices of relatively low acid, of which mature orange juice may be an example, (second) juices of intermediate acidity of which mixtures of orange and lemon juice, grapefruit juice, acidified orange juice, and the like, may be examples, and (third) juices which are high in acidity, such as lemon juice. Generally stated, juices of the first class may have a pH of above 3.17, those of the second class lying between a pH of about 2.85 to 3.17, and the third or higher acid juice below a pH of 2.85. This classification has been adopted principally for convenient reference. However, it is a natural classification since certain types of orange juice will have a pH as low as 3.2 and, therefore, different types of orange juice will spread over the first class. Likewise, different types of lemon juice may be spread over a considerable portion of the range of the third class.

The particular conditions of treatment applicable to various juices and juice products will, for the purpose of clear understanding, be set forth in considerable detail below. However, it may be broadly stated that juices of the first class may be treated at temperatures from about 84° C. to about 93° C. Juices of the intermediate class may be treated at temperatures at about from 79° C. to 89° C. or 90° C., and juices of the last class may be treated at from 75° C. to 88° C.

In carrying out this invention with citrus juice of the first class, such as orange juice, the juice may be heated to a temperature of from about 84° C. to 93° C. within about 0.2 to 2 or 3 minutes. The particular temperature employed will, as explained, depend upon the particular characteristics of the juice. The juice is then preferably held at this proper temperature for about 0.1 to 2 or 3 minutes. This holding temperature, as also explained, will be governed in accordance with the characteristics of the juice being treated. Thereafter, the juice is rapidly cooled to a suitably low temperature, such as 15° C. to 25° C. or lower, but at all events to a temperature below about 45° C.

The optimum temperature for orange juices is between about 86° C. and 93° C. and, with the exception of those juices hard to stabilize, a preferred temperature may be about 88° C. to 89° C.

More specifically, a pure orange juice having a pH of 3.73 may preferably be treated at a temperature of 88° C. to 91° C. With a minimum holding time of, say, 10 to 20 seconds, the higher temperatures would be employed, whereas at 88° C. a juice of pH of 3.73 and having a large amount of pulp might require a holding time as long as 2 minutes with heating and cooling times of, say, 3 minutes each. These latter treating times and temperatures could also be satisfactorily regarded as a minimum to insure complete stabilization of a pulp type juice having a pH as high as 3.79.

With these same juices at a holding temperature of 89° C., a holding time of ½ minute and heating and cooling times of 1.5 minutes would be desirable to insure stabilization.

The maximum temperatures mentioned hereinabove may need to be increased somewhat in the event the juice is of unusually high pH (low acidity), or contains entrapped air or large proportions of coarse solids, in order to obtain stability of the cloud, but such higher temperatures may deleteriously affect the color and flavor. When the juices are relatively free from entrapped air and heavy metals, such as copper, maximum temperatures as high as 96° C. may be used without producing heat coagulation effects or materially impairing the flavor. The preferred range, 88° C. to 89° C., may, in such cases, be extended up to about 91° C. without producing heat damage to any extent. With juices particularly hard to stabilize and relatively insusceptible to heat damage, due to the absence of entrapped air and heavy metals such as copper, the preferred range may go as high as 93° C.

Orange juices having a pH of the order of 3.4 and relatively low in insoluble solids may be completely stabilized by holding a temperature of about 87° C. for a time of approximately 1.5 minutes with heating and cooling times of about the same order. A highly acid orange juice of, say, a pH of 3.2 and low in insoluble solids, as an example, one of the rolled juices referred to, has been found to be stabilized with a temperature approaching the minimum given hereinabove for the general class of orange juices and with a holding time of the order of 0.1 minute and heating and cooling times slightly in excess of 1 minute. However, to allow for natural variation, and to insure stabilization, treatment at 88° C. for 2 minutes or at 89° C. for 20 seconds is preferred for juices of these latter types.

Juices of the second class may be represented by a mixture of orange and lemon juice having a pH of 3.17, which may be treated at a temperature range of from about 84° C. to 90° C., and by acidified orange juice having a pH of about 2.85, which may be treated at a temperature ranging from 79° C. and 89° C. or 90° C. With these examples and using treatments at or near the minimum holding time, that is, on the order of 10 to 20 seconds, temperatures in the upper portion of the range specified should be employed.

With these same juices and holding times, say, of two minutes, minimum temperatures to insure stabilization while allowing for natural variations should be 85° C. at pH 3.17 and 82° C. at pH 2.85. Likewise, to insure relatively complete stabilization with holding time of one-half minute and with heating and cooling times of 1.5 minutes, a juice of pH 2.85 would preferably be treated at a temperature of 84° C. and a juice of pH 3.17 would be treated at 86° C.

The range of treating temperatures for grapefruit, which also seems to lie in this intermediate class, is from about 80° C. to 90° C.

The third or highly acid class of juices may, for the most part, be regarded as limited to lemon juice, although obviously it could include other highly acid or highly acidified citrus juices. In juices of this class, the high acidity tends to retard the activity of naturally occurring enzymes. This is particularly true in concentrated lemon juice and certain highly acid lemon juices, which may approach a pH of 2.2.

For lemon juice, temperatures of 75° C. to 88° C. with holding times of from 0.1 to 2 minutes have given satisfactory results. At the most acid end of this range, temperatures of about 72° C. have given satisfactory results. The optimum temperature for lemon juices seems to lie within the range of about 78° C. to 83° C. More particularly, juices having pH of about 2.34 may be treated at a temperature range of about 76° C. to 88° C.

More specifically, burred lemon juices having pH values of from 2.34 to 2.41 were treated at temperatures of 75° C., 78° C., and 81° C., and thereabove with differing holding times, and then concentrated. None of these exhibited flocculation even upon storage of nine or ten months. The concentrates prepared from juices treated at 75° C., and 78° C., and 81° C. with heating and cooling times of about 0.2 minute and a holding time of about 1 minute, all exhibited a noticeable increase of viscosity at the end of about ten months, although no positive jellification was observable. The concentrates prepared from juice treated at about 81° C. with a heating time of 1.1 minutes, a holding time of 1.5 minutes and a cooling time of 1.7 minutes, and from juices treated at this temperature for a longer time, or at higher temperatures, were all distinctly fluid. This seems to indicate that it is preferable to treat lemon juices at a temperature within the upper portion of the range specified, say at 83° C. or even 85° C.

As stated hereinabove, the presence of absorbed or occluded air, size and quantity of solids, and the other variables referred to herein should be taken into consideration when determining the amount of heat which will give substantially perfect stabilization, and at the same time give the best flavor and other characteristics, and the examples will be of material assistance in obtaining the best results.

It is apparent from what has been said that there is a minimum amount of heating necessary to obtain stabilization of the cloud in citrus juices. There is both a fairly critical minimum temperature that must be reached for each particular juice, and a minimum time that the juice must remain at that temperature. Longer times of treatment at temperatures below the minimum do not produce the desired result. The minimum temperature is also related to the active acidity for each particular juice. Furthermore, when there are larger amounts of insoluble solids in the juice, longer holding times are required in order to produce the desired result, although to some extent higher temperatures above the minimum can be used in place of prolongation of the holding time at the minimum temperature.

Summarizing, the relationships between pH values and minimum temperatures as set forth above may be tabulated thus:

|  | ° C. |
| --- | --- |
| pH 2.2 | 72 |
| pH 2.34 | 75 |
| pH 2.85 | 79 |
| pH 3.17 | 84 |
| pH 3.79 | 89 |

It will be understood that with regard to the various specific examples of juices discussed hereinabove, I prefer in each instance not to go above the maximum temperature indicated for the general class with which the particular juice is grouped. However, in treating any particular juice, the maximum temperature employed in each case will be dependent principally upon the amount of heat damage the operator is willing to inflict upon the product. Therefore, it is obviously possible to employ somewhat higher temperatures. Such an operation will, in most cases, secure relatively good stabilization of the cloud, even though it will cause some loss of the natural colors and flavors, and in some cases will materially hasten darkening or browning of the product.

In general the lower temperatures will be effective in connection with the lower pH values. Also, shorter holding times can be employed at the higher temperatures and the longer holding times at the lower temperatures, as a general rule. If the juice contains relatively coarse solids, it is desirable to employ a longer holding time. If the juice is not deaerated before treatment, the air content will retard penetration of heat throughout the juice and as a result, the higher temperatures and the longer holding times should preferably be employed.

By following the teachings of this invention and observing and considering the various factors to which attention is drawn herein, the operator may readily select the temperature and time conditions which will give substantially complete stabilization of the juice. To obtain the best all-round results, the minimum conditions that will insure stabilization should be used, whether they be a low temperature with a long holding time or a high temperature with a very short holding time. Juices hard to stabilize may require both times and temperature of treatment approaching the maxima given herein.

For purposes of definition, it may be stated that the finely divided insoluble material occurring naturally in citrus juices extracted by any of the known methods is composed largely of colored fruit pigments and very fine particles of albedo, juice sacs and other materials. The cloud is responsible in a large part for the characteristic color and general appearance of the juice and carries much of the flavor. The juices also include coarser solids which may settle out within a few hours to form a loose layer in the bottom of the container. These larger particles consist of juice sacs, pieces of albedo, section coverings, membranes, etc.

When a juice is not stabilized in accordance with this invention, the cloud will start to settle shortly after the coarse insoluble solids have settled to the bottom. Flocculation of the cloud may either appear to start at the top or the coagulation or flocculation may be practically simultaneous throughout the height of the juice. In some juices the coarse pulp forms a weakly jellied mass in the bottom of the container, which weakly jellied mass contracts and separates from the sides of the container.

A juice containing particles which will not pass through a strainer comprising a 20 mesh sieve, is considered a juice containing coarse solids. Ordinarily, a burred juice has a high content of total insoluble solids, the proportion of colloidal material being relatively small (with respect to total insoluble solids) whereas a large proportion of the insoluble solids consists of coarse material such as juice sacs.

In burred juices, the volume of coarse solids (remaining on a 20 mesh sieve) may be about 15% of the volume of juice. In rolled juice substantially all of the solids will pass a 40 or 60 mesh sieve and the total amount of insoluble solids may be in the neighborhood of 2% by volume. The total insoluble solids content may be determined by either screening the total juice and then measuring the volume of material left on the screen, or preferably the following method is employed: the total insoluble solids may be determined by centrifuging the juice, then measuring the volume of the compacted solids. Centrifuging for a period of five minutes at 2000 R. P. M. has been used. Some burred juices will show a volume of 15% of coarse insoluble solids by centrifuging whereas the same juices by ordinary screening may show a volume of coarse insoluble solids of about 25%. When the centrifuging method of testing is employed, the volume of solids remaining on a 20 mesh screen may be obtained by screening the juice, centrifuging the screened juice and then measuring the volume of the residual solids and subtracting from the volume of total solids obtained by centrifuging.

As shown in Fig. 1, the juice may be supplied to a suitable vessel 10 provided with an agitator 11 as by means of a valved line or other valved port 12. The juice may be deaerated in said vessel 10, a suction line being indicated at 13. The deaerated juice may then be supplied by valved outlet 14 to a pump 15 and passed through a heating device 16 wherein a flowing stream of the juice is quickly raised to the required temperature and maintained at such temperature for the required period of time. The heat exchanger 16 may be so proportioned and the velocity of the flowing stream of juice so controlled as to produce the required heat transfer within the required period of time. While the particular apparatus employed is not of great importance so long as it is satisfactory for the purpose, I find that good results are obtained by using what is essentially a system of three concentric pipes. Such a system is indicated in Fig. 2. The juice may be admitted by line 17 into a pipe 18 having a centrally disposed tube 19 through which a heating medium (steam or, preferably, hot water) is supplied. The conduit 18 is surrounded by a larger conduit 20. The annular space between the conduit 20 and the concentrically disposed pipe 18 is supplied with a heating medium (steam or, preferably, hot water) as by line 21. Spiral vanes may be placed in the juice space so as to give more effective heat interchange and to provide for a more positive and uniform flow of all portions of the body of juice. In this manner, a relatively thin film of juice may be maintained at an even rate of flow, all juice getting approximately the same time of treatment under conditions conducive to rapid heat transfer. The heated juice may be discharged by line 22 and passed into a suitable cooler 23 similar in construction to the heat interchanger 16 wherein the juice is rapidly brought to a relatively low temperature by means of brine or other refrigerating agent passing in heat exchange relationship to the juice.

If desired, the juice may be rapidly cooled to a freezing temperature and the semi-frozen juice may then be placed in suitable containers and frozen hard for storage, shipment, sale or other disposition. As a flowing stream of juice is thus refrigerated, it is possible to maintain a uniform suspension of solids during freezing.

Instead of using the refrigerating coils 23, the juice may be concentrated under vacuum at temperatures not exceeding about 45° C. and preferably at temperatures of between 35° C. and 45° C. In the event it is desired to concentrate the juice, the heat-treated juice may then be passed by lines 22 and 24 directly in the vacuum concentrator 25 provided with a condenser 26, loss of heat during evaporation reducing the temperature of the juice to below 45° C.

The stabilized juice discharged by line 22 may be fed directly into cans, bottles or other containers and these containers then sealed and chilled. If desired, the citrus juices may be made into a syrup and the syrup then subjected to the heat stabilization process of this invention.

As has been mentioned hereinabove, more acid juices require lower temperatures or shorter times of treatment and this fact is of great practical importance. It may be advantageous, for example, to add acid to orange juice before heat treatment whenever the orange juice is to go into a product where acid is to be added subsequently, thus permitting the use of a lower temperature during the heat treatment and obtaining all of the desirable results possible at the higher temperatures. Therefore, in those cases where higher temperatures have some undesirable effects both upon the flavor and the stability of the cloud, such higher temperatures may be avoided by the use of the lower temperatures which in turn are made practicable by acidification before heat treatment.

After being treated as described hereinabove, the juice may be concentrated up to about 70% soluble solids by weight and/or made up into a beverage or beverage syrup, or any other desired product. For example, a concentrated orange juice made by suitably concentrating juice that has been treated by my preferred process, maintains a much better and more uniform suspension of solids, shows no tendency to jell (in fact remains distinctly fluid), usually retains a more suitable color and has a markedly less tendency to develop undesirable flavors. Furthermore, beverages made from or with such a product possess a much more stable cloud than similar beverages made from juices not heat-treated, or heat-treated by old methods.

Syrups made from juices processed by the new method are relatively stable with regard to suspended matter. Suspended material in syrups of about 60° Brix, and higher, remains in uniform suspension, showing little or no tendency to rise or settle in the container. In lighter syrups, the coarsest particles may settle out to some extent but the finer particle suspension and cloud are quite uniform. This uniform dispersion of insoluble solids gives a natural and attractive appearance to the syrup and such syrups are readily usable in fountain syrup dispensers. At this point, a distinction should be pointed out between separation in syrups or concentrated juices and in beverages. In the former, particularly in the heavier syrups, i. e., syrups high in soluble solids, as pointed out above, the insoluble material as a whole is involved. In beverages and unconcentrated juices, even more than in the lighter syrups, the very finely divided material, or cloud, is the important consideration; the coarse material usually settles out in time even though no flocculation has occurred and the cloud remains good. The viscosity of these syrups may be slightly greater but is comparable to that of syrups made from unprocessed juices, or those processed by old methods.

In syrups made from juices processed by the old method, the suspended matter flocculates and rises to the top, settles to the bottom, or in some cases part of the flocs go to the top and part to the bottom. The liquid outside of the pulp layer is usually clear. Such syrups are very unattractive and unsalable and can not be used satisfactorily in fountain syrup dispensers.

Other citrus juices and products therefrom, when the juice has been treated in accordance with my invention, possess greatly improved character as to appearance, taste, and general stability.

Obviously, my new process also accomplishes the results ordinarily ascribed to former processes of heat treatment, or pasteurization, namely, the destruction of organisms such as bacteria, mold spores, yeasts and the like. Moreover, it accomplishes this without materially changing the initial flavor or color of the juice, or the appearance of the solids thereof.

Citrus juices treated in accordance with this invention will be characterized by the presence of natural, soluble pectin but will not exhibit undesirable flocculation of the cloud and/or jellification.

Furthermore, the naturally occurring enzymic material has been substantially reduced to an inactive condition. Juices treated in accordance with this invention and concentrated to 60% total solids or more, may be rediluted to below 50° Brix and stored at atmospheric temperatures without flocculation of the cloud, even when the pH is not materially below 3.0. It is to be remembered that in addition to the stabilization of the cloud, the unconcentrated products will not darken or change in flavor as rapidly as products of the prior art and that the changes in color and flavor which do occur are but minor and do not impair the salability or palatability of the products.

In order to detect by a test method the presence of flocculating enzymes or enzymic substances in active form in citrus juice, the juice may be treated as follows, the particular examples given illustrating the application of the tests to orange juice:

In testing a concentrated juice the concentrate is diluted with distilled water so that the final volume concentration ratio of the juice in the test samples will be 1.5 to 1. In making this dilution the ingredients are added as follows:

Concentrated juice to give
|  | volumes of juice | 1.5 |
| --- | --- | --- |
| Pectin, commercially pure | g | 0.11 |
| Sodium benzoate | g | 0.225 |
| Barium chloride | g | 0.4 |
| Citric acid crystals to give pH |  | 2.9–3.0* |
| Distilled water to make | ml | 100.0 |

*About 3.7% total citric acid, as anhydrous, is usually required in the test sample to give pH 2.9–3.0.

The pectin, sodium benzoate, barium chloride, and citric acid are added in the form of solutions, as follows:

Pectin solution _____ 4% pectin by weight
Benzoate solution _____ 0.4 g. benzoate/ml.
Barium chloride solution
   0.3 g. BaCl₂.2H₂O/ml.
Citric acid solution ____ 0.5 g. crystalline acid/ml.

The test sample is stored at 37° C. and the flocculation of cloud is checked by testing in a centrifuge. For this test a 5 ml. portion of the test sample is diluted to 20 ml. with distilled water. The diluted sample is centrifuged 2 minutes at 2000 R. P. M. in 15 ml. plain centrifuge tubes. Completely flocculated juice centrifuges out crystal clear. By the use of comparison samples, the extent of partial flocculation can be determined.

Flocculation of cloud is complete in the test sample before the juice sets up to a solid jelly structure. Some time after flocculation is complete the jelly structure becomes continuous or solid and syneresis becomes evident. During this later stage of the process, flocculation of cloud is easily detected by visual observation.

In testing a natural strength orange juice the test is carried out substantially as described above except for the amount of juice used in the test sample. The sample is prepared as follows:

| Juice (natural strength) | ml | 100.0 |
| --- | --- | --- |
| Pectin, commercially pure | g | 0.11 |
| Sodium benzoate | g | 0.25 |
| Barium chloride | g | 0.40 |
| Citric acid crystals to give pH |  | 2.9–3.0* |

*About 2.7% total citric acid, as anhydrous, will usually be required in testing the natural strength juice.

The test sample is stored and tested for cloud stability in the manner described above. For the centrifuge test a 6.4 ml. portion of sample is diluted to 16 ml. with distilled water.

In the test as described I make use of pectin sold commercially and produced in accordance with the teachings of U. S. Patent 1,497,884, the desired pectin being fairly rapid as to its setting time characteristics and being sold commercially under the designation Exchange Brand Citrus Pectin No. 433 U.

Flocculation of the juice within a short period of time, say somewhat less than 1 day, indicates the presence of flocculating enzymic substances in an active condition in appreciable amounts. If the juice product retains its fluidity, uniformity, and suspended cloud in stable condition and exhibits no undesired flocculation and jellification during a period of several days, this indicates that the juice product has the naturally occurring cloud-flocculating enzymes in inactive form and that it is free from cloud-flocculating enzymes in active form. Such a juice product retains its cloud in stable condition under all conditions which said juice product is normally subject to in commercial use. Such a juice product constitutes the stabilized citrus juice product of this invention in preferred form.

By the term "citrus juice" or "citrus juice product" as used herein, reference is made to fruit products obtained from fruit by pressing, burring, grinding, and the like, and subsequently suitably otherwise treated, if desired.

It is to be noted that rapid heating to the temperatures indicated, followed immediately by rapid cooling, is alone quite insufficient to accomplish the desired results. The juice must be maintained at the high temperatures specified for the required length of time. The time factor is apparently primarily of value in getting the pulp particles up to the required temperature and in compensating for any uneven rate of flow.

Having thus described the invention, its mode of operation and conditions conducive to its effective operation, it is to be understood that numerous changes and variations may be introduced without departing from the spirit thereof.

All such changes and modifications as come within the scope of the appended claims are embraced thereby.

I claim:

1. In a process of stabilizing citrus juice products of different pH values, the steps of: determining the pH of the juice; heating the juice within a period of time insufficient to permit enzymic coagulation of the cloud to a temperature not below a minimum determined by the range of about 72° C. at pH 2.2 to about 89° C. at pH 3.79, juices of higher pH requiring a higher minimum temperature in accordance with said range; maintaining the juice at said temperature for a period of time from 0.1 minute to 3 minutes, longer holding times being employed with juices containing larger amounts of insoluble solids; and cooling the juice.

2. In a process of stabilizing citrus juice products of pH 3.17 and above, the steps of: determining the pH of the juice; heating the juice within a period of time insufficient to permit enzymic coagulation of the cloud to a temperature not below a minimum determined by the range of about 84° C. at pH 3.17 to about 89° C. at pH 3.79; juices of higher pH requiring a higher minimum temperature in accordance with said range; maintaining the juice at said temperature for a period of time from 0.1 minute to 3 minutes, longer holding times being employed with juices containing larger amounts of insoluble solids; and cooling the juice.

3. In a process of stabilizing citrus juice products of pH 2.85 to 3.17, the steps of: determining the pH of the juice, heating the juice within a period of time insufficient to permit enzymic coagulation of the cloud to a temperature not below a minimum determined by the range of about 79° C. at pH 2.85 to about 84° C. at pH 3.17; juices of higher pH requiring a higher minimum temperature in accordance with said range; maintaining the juice at said temperature for a period of time from 0.1 minute to 3 minutes, longer holding times being employed with juices containing larger amounts of insoluble solids; and cooling the juice.

4. In a process of stabilizing citrus juice products of pH below 2.85, the steps of: determining the pH of the juice; heating the juice within a period of time insufficient to permit enzymic coagulation of the cloud to a temperature not below a minimum determined by the range of about 72° C. at pH 2.2 to about 79° C. at pH 2.85; juices of higher pH requiring a higher minimum temperature in accordance with said range; maintaining the juice at said temperature for a period of time from 0.1 minute to 3 minutes, longer holding times being employed with juices containing larger amounts of insoluble solids; and cooling the juice.

5. In a process of stabilizing citrus juice products of pH 2.85 and above, the steps of: determining the pH of the juice; heating the juice within a period of time insufficient to permit enzymic coagulation of the cloud to a temperature not below a minimum determined by the range of about 79° C. at pH 2.85 to about 89° C. at pH 3.79; juices of higher pH requiring a higher minimum temperature in accordance with said range; maintaining the juice at said temperature for a period of time from 0.1 minute to 3 minutes, longer holding times being employed with juices containing larger amounts of insoluble solids; and cooling the juice.

6. In a process of stabilizing citrus juice products of pH between 2.2 and 3.79, the steps of: heating the juice within a period of time insufficient to permit enzymic coagulation of the cloud to a minimum temperature ranging from about 72° C. to about 89° C.; juices of higher pH requiring a higher minimum temperature in accordance with said range; maintaining the juice at said temperature for a period of time from 0.1 minute to 3 minutes, longer holding times being employed with juices containing larger amounts of insoluble solids; and cooling the juice.

7. In a process of stabilizing citrus juice products of pH between 2.34 and 3.79, the steps of: heating the juice within a period of time insufficient to permit enzymic coagulation of the cloud to a minimum temperature ranging from about 75° C. to about 89° C.; juices of higher pH requiring a higher minimum temperature in accordance with said range; maintaining the juice at said temperature for a period of time from 0.1 minute to 3 minutes, longer holding times being employed with juices containing larger amounts of insoluble solids; and cooling the juice.

8. In a process of stabilizing citrus juice products of pH between 2.2 and 2.85, the steps of: heating the juice within a period of time insufficient to permit enzymic coagulation of the cloud to a minimum temperature ranging from about 72° C. to about 79° C.; juices of higher pH requiring a higher minimum temperature in accordance with said range, maintaining the juice at said temperature for a period of time from 0.1 minute to 3 minutes, longer holding times being employed with juices containing larger amounts of insoluble solids; and cooling the juice.

9. In a process of stabilizing citrus juice products of pH between 3.17 and 3.79, the steps of: heating the juice within a period of time insufficient to permit enzymic coagulation of the cloud to a minimum temperature ranging from about 84° C. to about 89° C.; juices of higher pH requiring a higher minimum temperature in accordance with said range; maintaining the juice at said temperature for a period of time from 0.1 minute to 3 minutes, longer holding times being employed with juices containing larger amounts of insoluble solids; and cooling the juice.

10. In a process of stabilizing citrus juice products of pH between 2.85 and 3.79, the steps of: heating the juice within a period of time insufficient to permit enzymic coagulation of the cloud to a minimum temperature ranging from about 79° C. to about 89° C.; juices of higher pH requiring a higher minimum temperature in accordance with said range; maintaining the juice at said temperature for a period of time from 0.1 minute to 3 minutes, longer holding times being employed with juices containing larger amounts of insoluble solids; and cooling the juice.

11. In a process of stabilizing orange juice, the steps of: determining the pH of the juice; heating the juice within a period of time insufficient to permit enzymic coagulation of the cloud to a temperature not below a minimum determined by the range of about 84° C. at pH 3.17 to about 89° C. at pH 3.79; juices of higher pH requiring a higher minimum temperature in accordance with said range; maintaining the juice at said temperature for a period of time from 0.1 minute to 3 minutes, longer holding times being employed with juices containing larger amounts of insoluble solids; and cooling the juice.

12. In a process of stabilizing acidified orange juice, the steps of: determining the pH of the juice; heating the juice within a period of time insufficient to permit enzymic coagulation of the cloud to a temperature not below a minimum determined by the range of about 79° C. at pH 2.85 to about 84° C. at pH 3.17; juices of higher pH requiring a higher minimum temperature in accordance with said range; maintaining the juice at said temperature for a period of time from 0.1 minute to 3 minutes, longer holding times being employed with juices containing larger amounts of insoluble solids and cooling the juice.

13. In a process of stabilizing mixtures of orange and lemon juices, the steps of: determining the pH of the juice; heating the juice within a period of time insufficient to permit enzymic coagulation of the cloud to a temperature not below a minimum determined by the range of about 79° C. at pH 2.85 to about 84° C.

at pH 3.17; juices of higher pH requiring a higher minimum temperature in accordance with said range; maintaining the juice at said temperature for a period of time from 0.1 minute to 3 minutes, longer holding times being employed with juices containing larger amounts of insoluble solids; and cooling the juice.

14. In a process of stabilizing lemon juice, the steps of: determining the pH of the juice; heating the juice within a period of time insufficient to permit enzymic coagulation of the cloud to a temperature not below a minimum determined by the range of about 72° C. at pH 2.2 to about 79° C. at pH 2.85; juices of higher pH requiring a higher minimum temperature in accordance with said range; maintaining the juice at said temperature for a period of time from 0.1 minute to 3 minutes, longer holding times being employed with juices containing larger amounts of insoluble solids; and cooling the juice.

JESSE W. STEVENS.